United States Patent [19]

Leedom

[11] 4,098,511
[45] Jul. 4, 1978

[54] VIDEO DISC HANDLING SYSTEM FOR A VIDEO DISC PLAYER

[75] Inventor: Marvin Allan Leedom, Princeton, N.J.

[73] Assignee: RCA Corporation, New York, N.Y.

[21] Appl. No.: 747,865

[22] Filed: Dec. 6, 1976

[51] Int. Cl.² .................... G11B 17/04; G11B 17/26
[52] U.S. Cl. .................................. 274/9 B; 206/309; 312/12; 274/1 R
[58] Field of Search .................. 274/1 R, 9 B, 42 R; 360/99, 97, 133; 358/128; 206/309, 312; 312/12, 17, 10

[56] References Cited

U.S. PATENT DOCUMENTS

| | | | |
|---|---|---|---|
| 3,377,072 | 4/1968 | Gentilini | 274/9 B |
| 3,823,948 | 7/1974 | Jenkins | 274/9 B |
| 3,836,731 | 9/1974 | Wilisch et al. | 360/99 |
| 3,941,391 | 3/1976 | Ohmiya et al. | 274/9 B |

Primary Examiner—Richard E. Aegerter
Assistant Examiner—John W. Shepperd
Attorney, Agent, or Firm—Eugene M. Whitacre; William H. Meagher; Dilip A. Kulkarni

[57] ABSTRACT

A protective cover, subject to a removable occupancy by a video disc, is inserted into a video disc player. During the insertion of an occupied cover into the player, an appropriately designed platform leads it to a fully inserted position such that a clamping device built into the player protrudes into the cover. The user then removes the cover allowing the video disc to remain in the player resting on the platform. When the player lid is closed, the platform is lowered to effect a transfer of the video disc resting thereon to the player turntable. Upon playback, the lid is raised to cause the video disc to rise with the platform. An empty cover is then inserted to return the video disc back into the cover. The subsequent withdrawal of the cover removes the enclosed video disc.

11 Claims, 16 Drawing Figures

VIDEO DISC HANDLING SYSTEM FOR A VIDEO DISC PLAYER

The invention relates to a video disc system, and, more particularly, to an apparatus for inserting and removing a video disc into and from a playback device while remaining enclosed in its protective cover.

In U.S. Pat. No. 3,842,194, issued to Jon K. Clemens, a video disc system is disclosed. In an arrangement therein disclosed, an information track consists of geometric variations in the bottom of a smooth spiral groove on the surface of a disc record. The disc record has a deposit of dielectric material overlying a coating of conductive material. During playback, variations in the capacitance formed between an electrode incorporated in a groove-riding stylus and the conductive coating of the disc record are sensed as it is rotated by a turntable to reconstruct the recorded information.

In the systems of the Clemens type, in order to obtain adequate playing time, the successive groove convolutions are relatively closely spaced on the surface of the video disc (e.g., 4.5 micrometers corresponding to a groove density of 5,555 gpi) and the signal elements in the groove bottom are relatively minute (e.g., signal element length — 0.3 to 0.8 micrometers and signal element depth of 0.10 to 0.15 micrometers).

The accumulation of dust on such video discs presents a considerable problem. The problem of dust accumulation is especially serious when the exposure of a video disc to the atmospheric dust is accompanied by the conditions of high temperature and high humidity. It is therefore advantageous to provide a cover which completely encloses a video disc in a dust-proof environment during its storage and handling.

The video discs of the type described above are prone to damage during their manual handling (e.g., scratches, fingerprints, etc). It is therefore desirable to provide a protective cover which permits insertion and withdrawal of an enclosed video disc into and from a playback device without the need for direct handling of the video disc by the user.

Pursuant to the present invention, a player includes a housing having an input slot dimensioned to permit an insertion therein of a protective cover subject to a removable occupancy by a disc record. Guide means are mounted in the housing for motion between an elevated position and a depressed position. The guide means are aligned with the input slot when it is occupying the elevated position.

Means are mounted in the player for protruding into an occupied cover during its arrival at a fully inserted position in the player. The protruding means precludes a removal of the disc record from the player during a cover withdrawal from the fully inserted position after such an occupied cover arrival, while permitting the disc record to rest on the guide means upon a conclusion of such a withdrawal.

Means are mounted to the player for causing motion of the guide means from the elevated position to the depressed position to effect a transfer of the disc record from the guide means to the player turntable.

Figure 1:
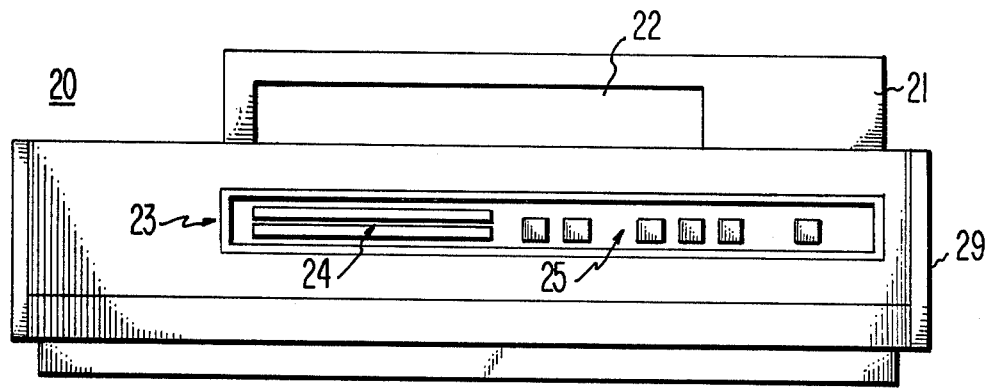
FIG. 1 illustrates a front view of a video disc player incorporating the present invention.
Figure 2:
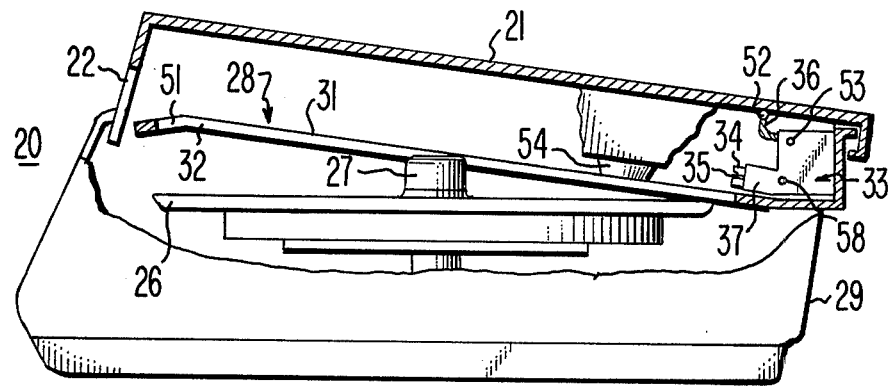
FIG. 2 shows a side view, partly in section, of the video disc player of FIG. 1.
Figure 3:
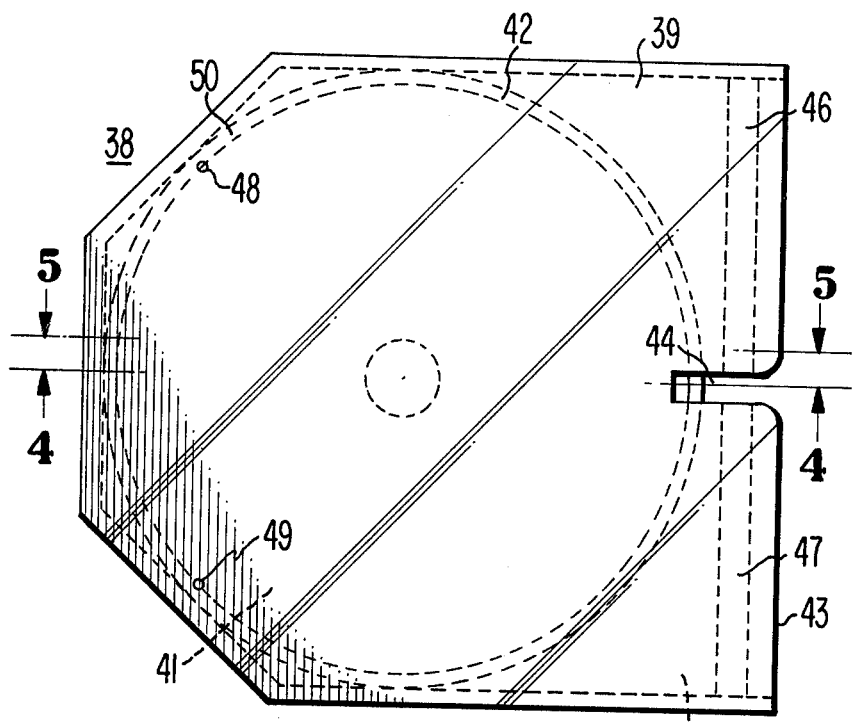
FIG. 3 shows a record protective cover suitable for use with the video disc player of FIG. 1.
Figure 6:
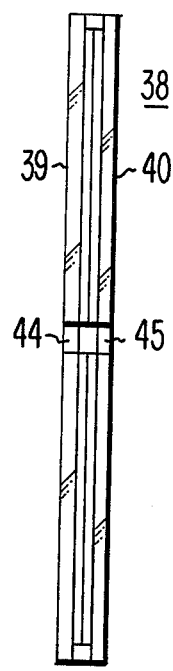
Figure 4:
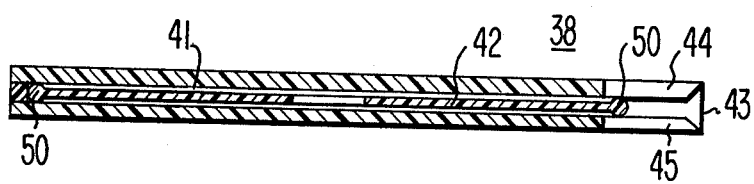
Figure 5:
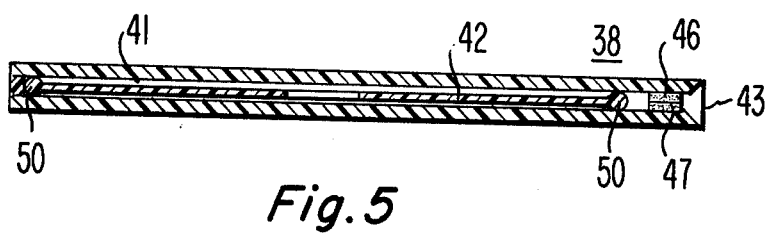
Figure 13:
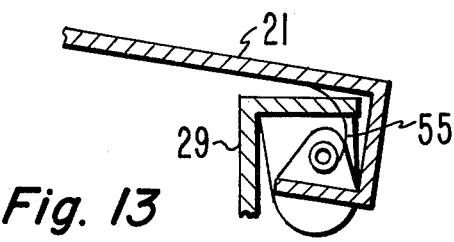
Figure 14:
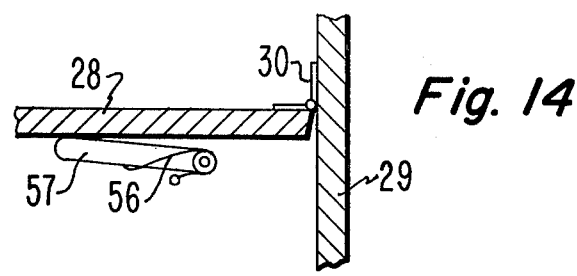
Figure 15:
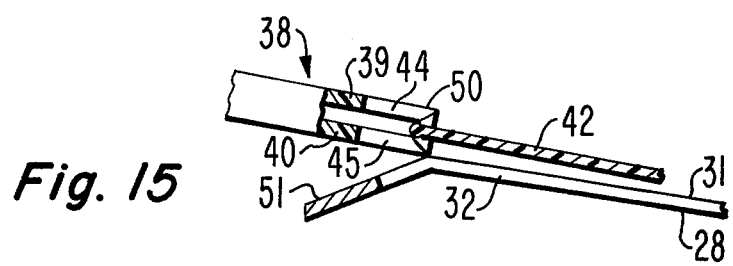
Figure 16:
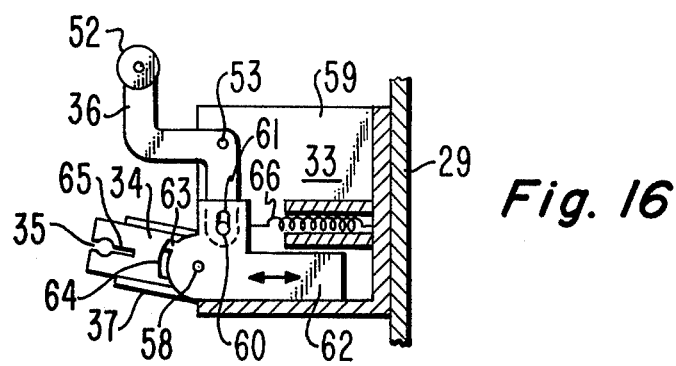

FIGS. 4 and 5 illustrate cross sections of the protective cover of FIG. 3 along the lines 4—4 and 5—5 respectively in FIG. 3;

FIG. 6 is an end view of the protective cover of FIG. 4;

FIGS. 7 through 12 represent a sequence of operations involved in inserting a video disc enclosed in a protective cover of FIGS. 3-6 into the video disc player of FIGS. 1 and 2, and its removal therefrom, without the need for the direct handling of the enclosed video disc;

FIG. 13 shows means for urging the lid of the video disc player of FIGS. 1 and 2 to open;

FIG. 14 illustrates means for biasing the guide means to an elevated position in the video disc player of FIGS. 1 and 2;

FIG. 15 shows how the video disc is caused to enter an empty protective cover of FIGS. 3-6 upon insertion thereof into the video disc player of FIGS. 1 and 2; and FIG. 16 illustrates the construction details of a disc record engaging device suitable for use with the video disc player of FIGS. 1 and 2.

FIG. 1 illustrates a video disc player 20 having a lid 21 which is shown disposed in the open position. The lid 21 has an opening 22 defining an input slot when the lid is open. The input slot is dimensioned to permit insertion of a record protective cover into the player and its removal therefrom. As can be seen from FIG. 1, the player includes a control panel 23 comprising a playing time indicator 24 and a set of push buttons 25.

Shown in FIG. 2 is a turntable 26 for rotatably supporting a video disc thereon for playback. The turntable 26 has a centering spindle 27 subject to reception in a centering aperture of a video disc upon its placement on the turntable.

Figure 8:
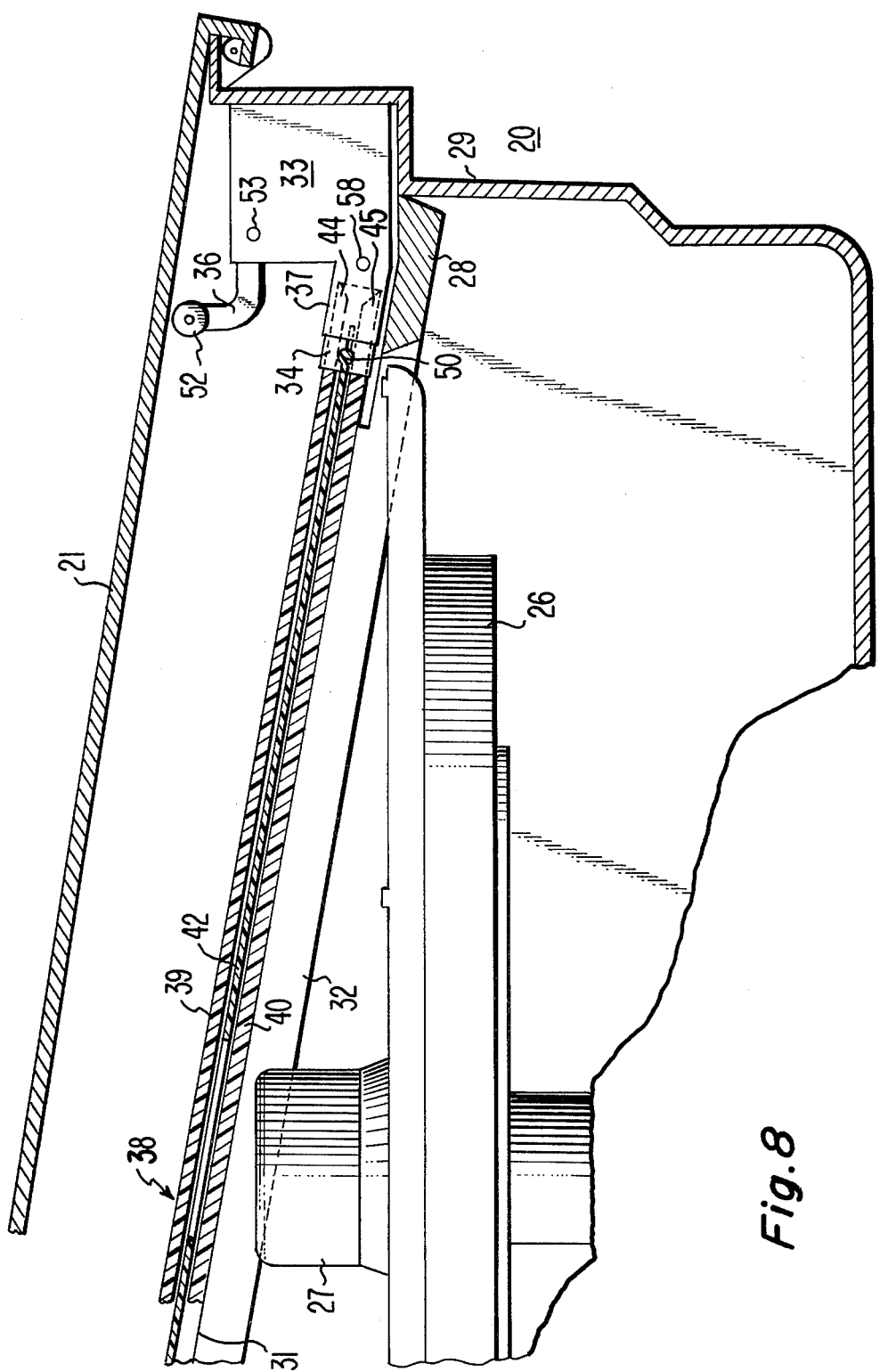
Figure 9:
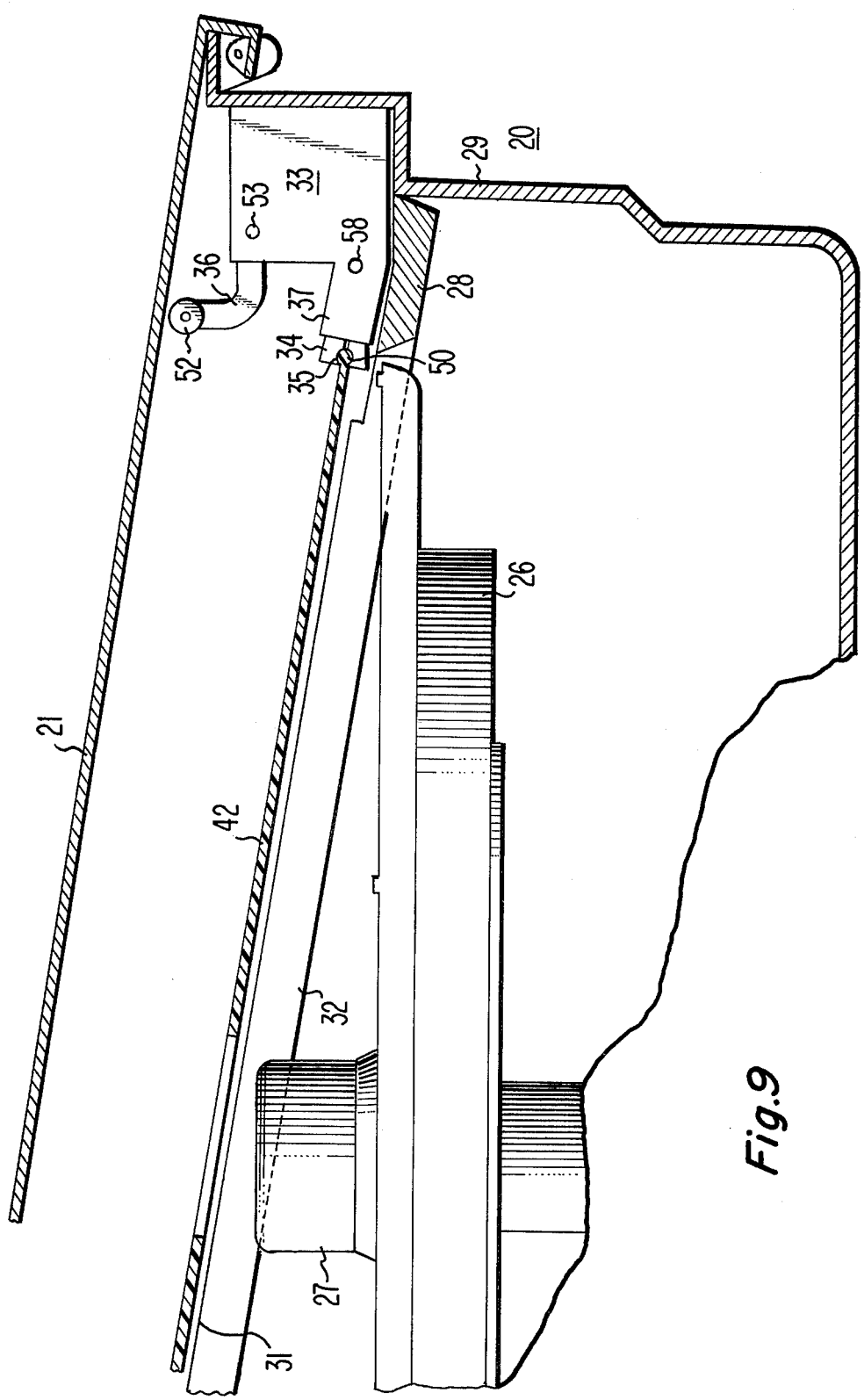
Figure 10:
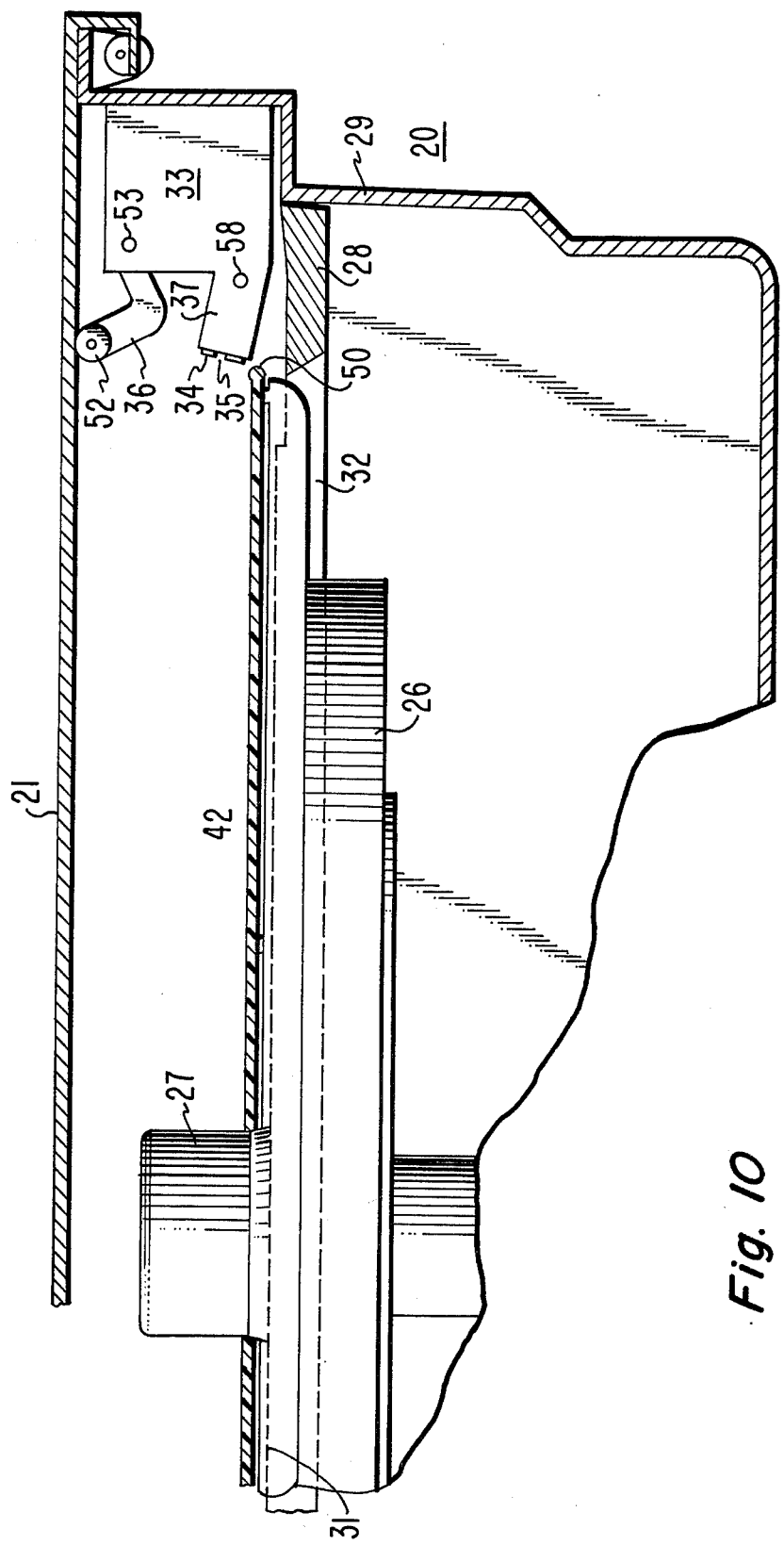

A platform 28 is pivotally mounted to the player housing 29 by a hinge 30 (FIG. 14) for motion between an elevated position (as shown in FIGS. 2, 7-9 and 11-12) and a depressed position (as shown in FIG. 10). The platform 28 has a surface 31 for properly locating a video disc while it is disposed in the elevated position.

The player includes a stylus arm carriage (not shown) which is translated during playback over a video disc resting on the turntable 26. The platform 28 has cutouts (not shown) to permit the stylus arm carriage to traverse over the turntable supported video disc without hindrance. The platform 28 has a central opening 32 for permitting the turntable 26 to protrude therethrough when it occupies the depressed position. A push button (not shown) is mounted on the player housing 29 to cause the lid 21 to open.

A clamping device 33 includes a member 34 which has a slot 35 dimensioned to have an interference fit with the bead of a video disc. The clamping device 33 further includes a pivotally mounted rocker arm 36 which causes the slotted member 34 to be retracted between a pair of strippers 37 when the player lid 21 is closed.

FIGS. 3-5 and 6 show a record protective cover 38 suitable for use with the video disc player of FIGS. 1-2. The cover 38 comprises a pair of juxtaposed panels 39 and 40 defining a cavity 41 for enclosing a video disc 42 and an opening 43 in communication with the cavity for permitting insertion and removal of the video disc into and from the cover. The panels 39 and 40 have cutouts 44 and 45 for permitting the slotted member 35 and the strippers 37 of the clamping device to protrude into the cover 38 when it is fully inserted into the player.

A pair of wiping pads 46 and 47 are secured to the interior surfaces of the cover 38 in the vicinity of the opening 43 for effecting a cleaning of a video disc during its insertion into and removal from the cover. The cover 38 has a pair of detents 48 and 49 for engagement with the bead portion 50 of the enclosed video disc 42 to prevent its accidental removal from the cover.

The wiping pads 46 and 47 may be made from any suitable soft, lintless material—for example, velvet, nonwoven polyester (made by Dupont), polyurethane foam (made by Scott Paper Co., Foam Division), etc.

A package of this type is disclosed in a concurrently filed U.S. patent application Ser. No. 747,730, of M. A. Leedom entitled "VIDEO DISC PACKAGE."

FIGS. 7-12 represent a sequence of operations involved in effecting an insertion of a video disc into the player, and its removal therefrom, while contained in its protective cover.

Figure 7:
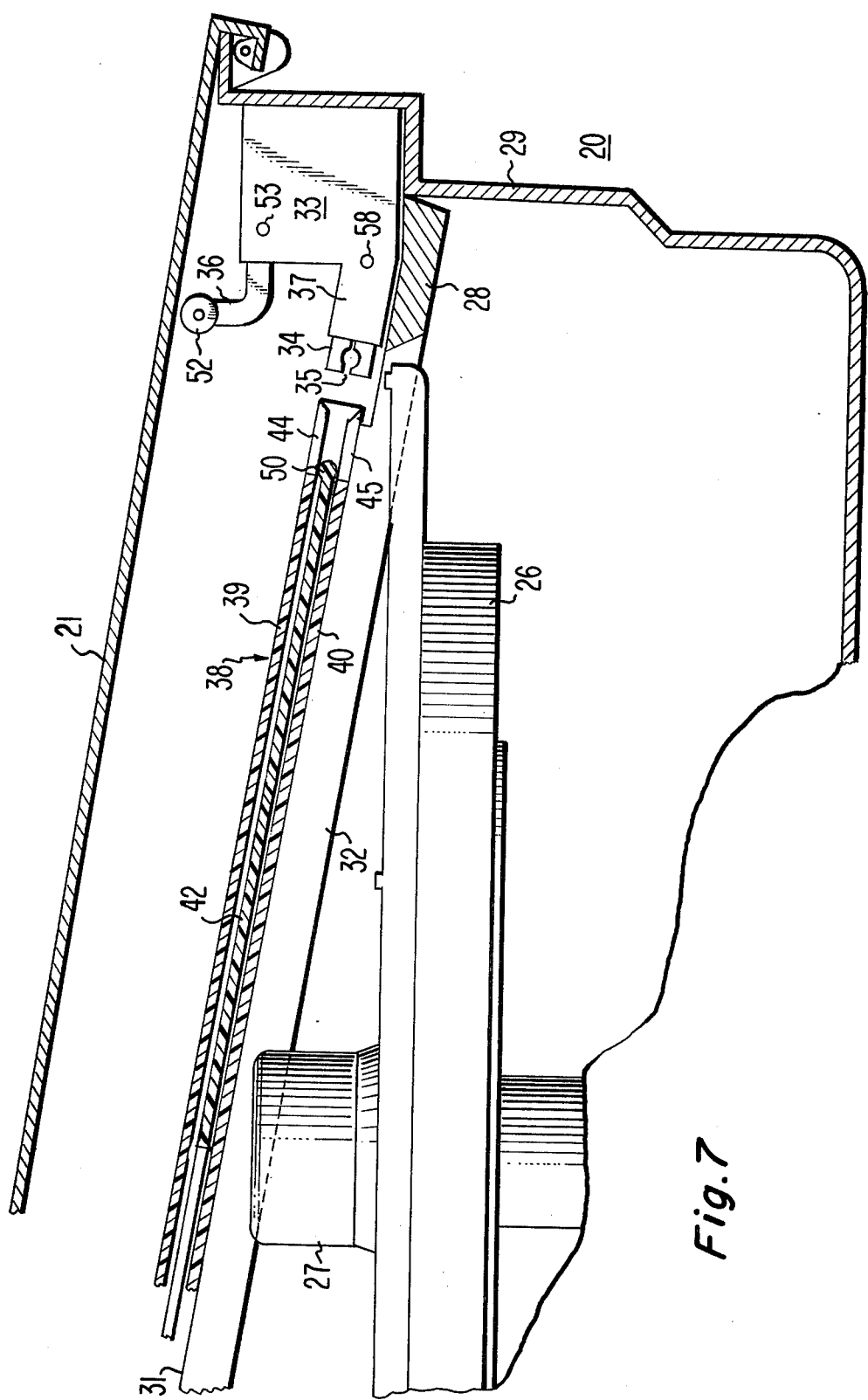

FIG. 7 shows the protective cover 38 while it is partially inserted into the player. When the player lid 21 is open, the portion 51 of the platform 28 in the vicinity of the input slot 22 is aligned therewith as shown in FIG. 2. Additionally, the portion 51 of the platform 28 is flared to facilitate the insertion of a protective cover into the player. During the insertion of the protective cover 38 into the player (FIG. 7), the surface 31 of the platform 28 leads it to a fully inserted position such that the slotted member 35 and the strippers 37 of the clamping device 33 are admitted into a slot defined by the cutouts 44 and 45 of the cover 38 as shown in FIG. 8.

When the cover 38 is fully inserted into the player, the bead 50 of the video disc 42 is received in the slot 35 of the member 34 as shown in FIG. 8. The slot 35 of the member 34 is in alignment with the bead of a video disc 42 when it is resting on the locating surface 31 of the platform 28 while enclosed in its protective cover as shown in FIG. 7.

The slot 35 has an interference fit with the bead 50 of the video disc 42, so that the slotted member 34 precludes a removal from the player of the video disc during the cover withdrawal after an occupied cover arrival at the fully inserted position in the player, permitting the video disc to remain in the player resting on the locating surface 31 of the platform 28 as shown in FIG. 9.

When the player lid 21 is closed, as shown in FIG. 10, a roller 52 secured to the rocker arm 36, and in engagement with the lid, causes the rocker arm to pivot about a pin 53 to, in turn, cause the slotted member 34 to retract between the strippers 37. The retraction of the slotted member 34 between the strippers 37 causes the clamping device 33 to release the video disc 42.

Additionally, when the player lid 21 is closed, a block 54 secured to the lid (FIG. 2) engages the platform 28 to cause it to pivot from the elevated position (FIGS. 2, 7-9 and 11-12) to the depressed position (FIG. 10).

The video disc 42, held by the slotted member 35, and resting on the locating surface 31 of the platform 28 (FIG. 9), is transferred to the turntable 26 (FIG. 10) during the motion of the platform 28 from the elevated position (FIG. 9) to the depressed position (FIG. 10), when accompanied by a release of the video disc by the slotted member 34.

Figure 11:
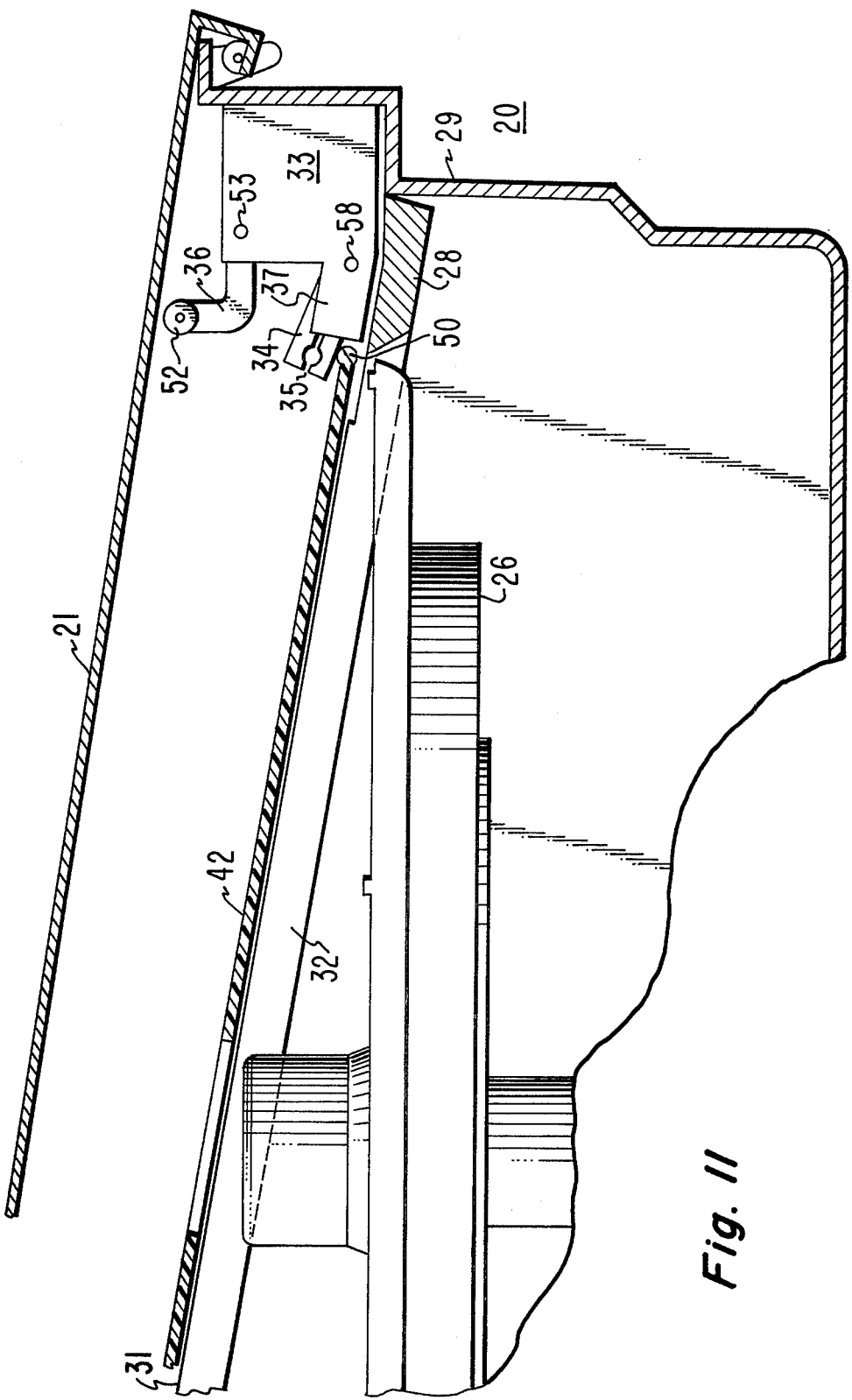

When the player lid 21 is opened by depressing a push button (not shown), a spring 55 (FIG. 13) causes the lid to rise to the open position (FIG. 11). As the lid 21 opens, a spring 56 connected to a member 57 in engagement with the platform 28 (FIG. 14) causes it to rise with the lid from the depressed position (FIG. 10) to the elevated position (FIG. 11). When the platform 28 moves from the depressed position to the elevated position, the video disc 42 resting on the turntable 26 (FIG. 10) is caused to rise with the platform (FIG. 11). When the video disc 42 rises, the bead 50 pushes the slotted member 34 out of the way by causing it to pivot about a pin 58 as shown in FIG. 11.

As shown in FIG. 15, the platform 28 has a flared portion 51 near the vicinity of the input slot 22 which causes a peripheral portion of the video disc 42 resting on the platform to overhang. When an empty cover 38 is inserted into the player, the overhanging peripheral portion of the video disc 42 is automatically lead into the cover. When the cover 38 is fully inserted in the player, (1) the video disc 42 is completely enclosed in the cover (FIG. 12), and (2) the detents 48 and 49 are caused to engage the bead of the video disc. Since the detents 48 and 49 engage the bead of a video disc only upon its full containment in its protective cover, the removal from the player of a video disc, while it is only partially enclosed in its cover, is avoided. When the cover 38 is withdrawn from the player, the enclosed video disc is removed from the player therewith.

Thus, it will be seen that the system allows a video disc to be inserted into and removed from a playback device while remaining enclosed in its protective cover.

The construction details of the clamping device 38 will now be explained in conjunction with FIG. 16. As shown therein, the rocker arm 36, having the roller 52 secured to its one end, is pivoted about the pin 53 mounted on a support member 59 of the clamping device 33. A pin 60 is secured to the other end of the rocker arm 36 which is received in a slot 61 provided in a member 62 reciprocably mounted to the support member 59.

Figure 12:
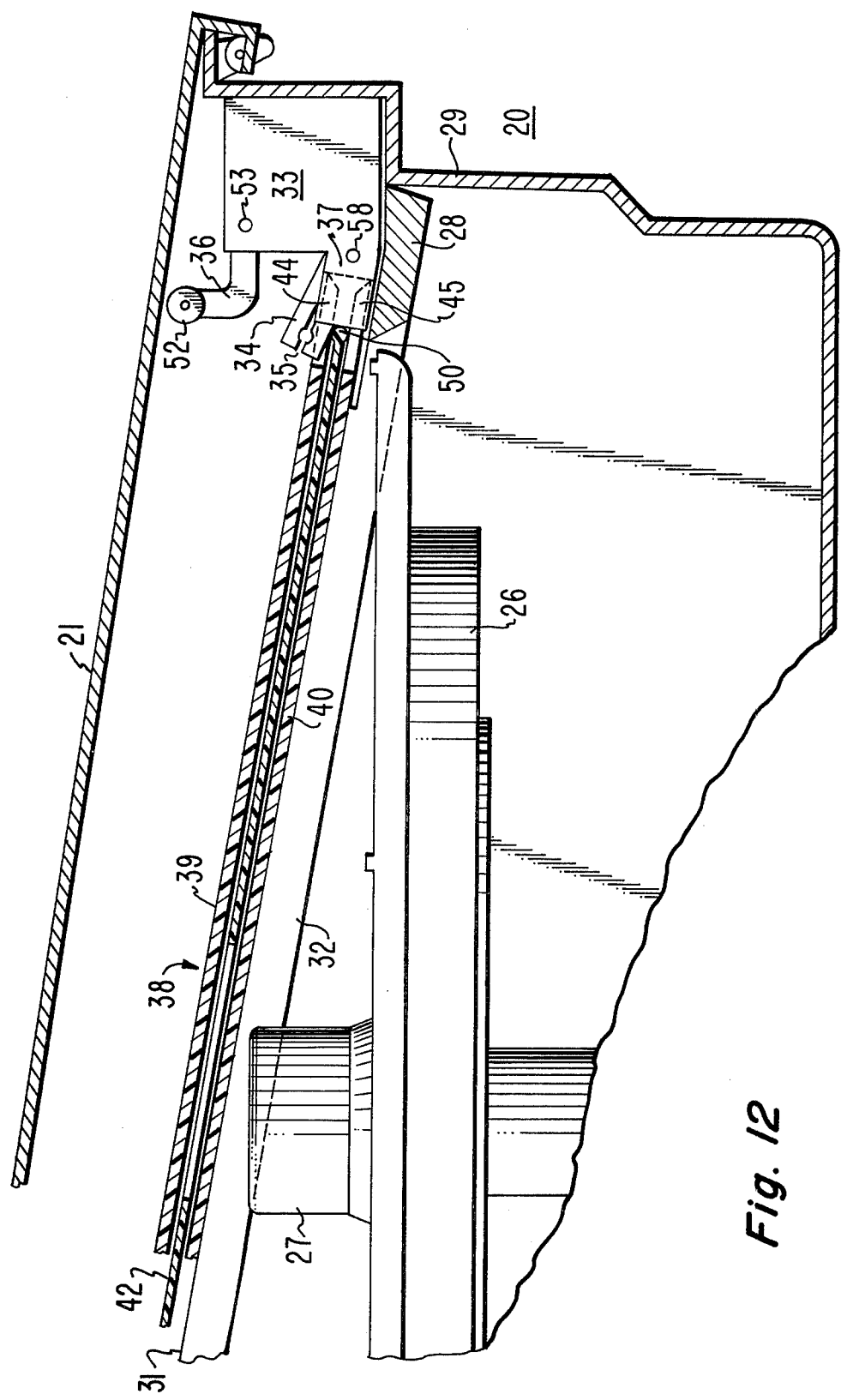

The slotted member 34 is pivoted about a pin 58 secured to the reciprocable member 62. A projecting portion 63 of the reciprocable member 62 is received in a cutout 64 provided in the slotted member 34. While the projecting portion 63 causes the slotted member 34 to align with the bead of a video disc enclosed in its protective cover is resting on the locating surface 31 of the platform 28 (FIG. 7), it allows the slotted member to be pushed out of the way when the video disc resting on the platform is allowed to rise therewith after playback (FIGS. 11 and 12).

The slotted member 34 has a recess 65 in communication with the slot 35 therein to allow the jaws defining the slot to flex in order to permit the bead portion of a video disc to be admitted therebetween (FIGS. 8-9).

A compression spring 66 connected between the reciprocable member 62 and the support member 59 causes the slotted member 34 to occupy an extended position and the rocker arm 36 to assume a raised position, as shown in FIG. 7, when the player lid 21 is open.

An embodiment of the present invention is disclosed in a concurrently filed U.S. patent application, Ser. No. 747,729, of C. F. Coleman entitled, "VIDEO DISC INSERTION/EXTRACTION SYSTEM FOR A VIDEO DISC PLAYER."

The foregoing is considered as illustrative only of the principles of the present invention. Further, since numerous modifications and changes will readily occur to those skilled in the art, it is not desired to limit the invention as to the exact construction and operation shown and described, and accordingly, all suitable modifications and equivalents may be resorted to provided they fall within the scope of the invention as claimed.

What is claimed is:

1. A player for recovering pre-recorded signals from a disc record removably subject to occupancy of a protective cover comprising:
   (A) a housing having an input slot dimensioned to permit insertion of a protective cover into said player and its removal therefrom;
   (B) a turntable rotatably mounted in said housing for supporting a disc record during playback;
   (C) guide means mounted in said housing subject to motion between an elevated position and a depressed position;
   said guide means being aligned with said input slot when said guide means is occupying said elevated position;
   (D) clamping means for causing a removal of a disc record from said cover during a cover withdrawal subsequent to an occupied cover arrival at a fully inserted position in said player in such manner that a disc record is retained in said player resting on said guide means upon conclusion of said cover withdrawal;
   said clamping means being mounted in said player such that it is positioned in the path of the contents of an occupied protective cover during cover passage to said fully inserted position in said player;
   (E) means for causing motion of said guide means to said depressed position; and
   (F) means for freeing said retained record from said clamping means, whereby said retained record is deposited on said turntable, for rotation therewith with independence from said clamping means, during motion of said guide means to said depressed position.

2. A player as defined in claim 1 wherein said clamping means includes means mounted at the end of said player remote from said input slot for engaging the outer bead of an enclosed disc record when an occupied cover arrives at said fully inserted position in said player to subsequently effect said record removal from said cover.

3. A player as defined in claim 1 wherein said clamping means includes means for engaging the contents of an occupied cover upon cover arrival at said fully inserted position in said player to effect said disc record removal from said cover.

4. A player as defined in claim 1 for use with a disc record removably subject to occupancy of a protective cover with a portion of said disc record being exposed through a slot disposed in said protective cover; wherein said clamping means includes means for engaging the exposed portion of such a disc record upon cover arrival at said fully inserted position in said player to effect said disc record removal.

5. A player for recovering pre-recorded signals from a disc record removably subject to occupancy of a protective cover comprising:
   (A) a housing having an input slot dimensioned to permit insertion of a protective cover into said player and its removal therefrom;
   (B) a turntable rotatably mounted in said housing for supporting a disc record during playback;
   (C) guide means mounted in said housing subject to motion between an elevated position and a depressed position;
   said guide means being aligned with said input slot when said guide means is occupying said elevated position;
   (D) clamping means for causing a removal of a disc record from said cover during a cover withdrawal subsequent to an occupied cover arrival at a fully inserted position in said player, whereby a disc record is retained in said player resting on said guide means upon a conclusion of said cover withdrawal;
   (E) closure means secured to said housing for motion between a first position permitting an access to said input slot and a second position denying an access to said input slot;
   (F) means responsive to motion of said closure means to said access denying position for causing motion of said guide means to said depressed position; and
   (G) means responsive to motion of said closure means to said access denying position for effecting a release of said retained disc record from said clamping means; wherein a retained disc record is transferred to said turntable, for rotation therewith with independence from said clamping means, when motion of said guide means to said depressed position is accompanied by said record release.

6. A player as defined in claim 5 wherein said clamping means includes means mounted in the player for engaging the outer periphery of an enclosed disc record when an occupied cover arrives at said fully inserted position in said player to subsequently effect said record removal from said cover.

7. A player as defined in claim 5 wherein said turntable is positioned lower than said guide means when said guide means is occupying said elevated position; and wherein said guide means has an opening having dimensions greater than the diameter of said turntable for permitting said turntable to protrude above said guide means when said guide means is occupying said depressed position to effect said record transfer.

8. A player as defined in claim 5 further including means for biasing said guide means toward said elevated position; said biasing means serving to raise said guide means to said elevated position when said closure means moves from said access denying position to said access permitting position.

9. A player as defined in claim 8 wherein the construction of said guide means is such that a peripheral portion of a retained disc record, resting on said guide means occupying said elevated position, overhangs portions of said guide means disposed in the vicinity of said input slot, so that when an empty protective cover is inserted through said input slot while said guide means is occupying said elevated position, the overhanging peripheral portion of such a retained disc record enters such an empty protective cover, whereby such a retained disc record reverts to said cover when it arrives at said fully inserted position.

10. A player for recovering pre-recorded signals from a disc record removably subject to occupancy of a protective cover comprising:
   (A) a housing having an input slot dimensioned to permit insertion of a protective cover into said player and its removal therefrom;
   (B) a turntable rotatably mounted in said housing for supporting a disc record during playback;
   (C) guide means mounted in said housing subject to motion between an elevated position and a depressed position;

said guide means being aligned with said input slot when said guide means is occupying said elevated position;

(D) means for engaging an enclosed disc record during arrival of an occupied cover at a fully inserted position in said player;

wherein said record engagement permits a removal of a disc record from said cover during a cover withdrawal subsequent to an occupied cover arrival at said fully inserted position in said player, whereby a disc record is retained in said player resting on said guide means upon a completion of such a cover withdrawal;

(E) means for causing motion of said guide means from said elevated position to said depressed position to effect a transfer of a retained disc record from said guide means to said turntable for rotation therewith with independence from said record engaging means; and (F) means for movably mounting said engaging means in said player;

said guide means and said record engaging means being so positioned that a retained record resting on said guide means displaces said record engaging means away from the record engaging position thereof when said guide means moves from said depressed position to said elevated position.

11. A player for recovering pre-recorded signals from a disc record removably subject to occupancy of a protective cover comprising:

(A) a housing having an input slot dimensioned to permit insertion of a protective cover into said player and its removal therefrom;

(B) a turntable rotatably mounted in said housing for supporting a disc record during playback;

(C) guide means mounted in said housing subject to motion between an elevated position and a depressed position;

said guide means being aligned with said input slot when said guide means is occupying said elevated position;

(D) means for engaging the outer bead of an enclosed disc record during arrival of an occupied cover at a fully inserted position in said player;

wherein said record engagement permits a removal of a disc record from said cover during a cover withdrawal subsequent to an occupied cover arrival at said fully inserted position in said player, whereby a disc record is retained in said player resting on said guide means upon a completion of such a cover withdrawal;

wherein said record bead engaging means comprises:
 (a) a pair of jaws;
 (b) means for biasing said jaws toward each other; and wherein, when a protective cover occupied by a disc record arrives at said fully inserted position, said jaws are opened to admit the record bead therebetween; said biasing means serving to close said opened jaws to effect said disc record removal from said cover;

(E) means for causing motion of said guide means from said elevated position to said depressed position to effect a transfer of a retained disc record from said guide means to said turntable for rotation therewith with independence from said record bead engaging means.

* * * * *